United States Patent
Hironaka et al.

(10) Patent No.: US 8,446,687 B2
(45) Date of Patent: May 21, 2013

(54) MAGNETIC DISK DRIVE AND METHOD FOR CONTROLLING MICROACTUATOR IN MAGNETIC DISK DRIVE

(75) Inventors: Hideki Hironaka, Sagamihara (JP); Tatsurou Sasamoto, Tama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/311,459

(22) Filed: Dec. 5, 2011

(65) Prior Publication Data

US 2012/0194943 A1    Aug. 2, 2012

(30) Foreign Application Priority Data

Jan. 28, 2011    (JP) ................................ 2011-016318

(51) Int. Cl.
*G11B 5/596*    (2006.01)
*G11B 21/02*    (2006.01)

(52) U.S. Cl.
USPC ................ 360/78.05; 360/75; 360/78.04

(58) Field of Classification Search
None
See application file for complete search history.

(56) References Cited

U.S. PATENT DOCUMENTS

| | | | |
|---|---|---|---|
| 6,833,974 B2 | 12/2004 | Koso et al. | |
| 7,019,938 B2 | 3/2006 | Miyata et al. | |
| 7,158,334 B2 | 1/2007 | Iwashiro | |
| 7,561,365 B2 | 7/2009 | Noguchi et al. | |
| 2002/0109932 A1* | 8/2002 | Aikawa et al. | 360/77.04 |
| 2007/0188909 A1* | 8/2007 | Hutsell et al. | 360/77.08 |

FOREIGN PATENT DOCUMENTS

| | | |
|---|---|---|
| JP | 2002-269939 A | 9/2002 |
| JP | 2003-141833 A | 5/2003 |
| JP | 2004-171736 A | 6/2004 |
| JP | 2005-317130 A | 11/2005 |
| JP | 2007-095119 A | 4/2007 |

* cited by examiner

*Primary Examiner* — Regina N Holder
(74) *Attorney, Agent, or Firm* — Knobbe, Martens, Olson & Bear LLP

(57) ABSTRACT

According to one embodiment, a magnetic disk drive includes a detector and a servo controller. The detector detects, as actual timestamps, time intervals at which a head reads servo sync marks recorded on a disk at predetermined intervals. The servo controller controls a VCM actuator and a microactuator with feedback control in order to position the head at a target position. The servo controller comprises a feedforward controller configured to compensate for disturbance. The feedforward controller comprises a difference detector and an integrator. The difference detector detects a deviation of the actual timestamps from target timestamps as a timestamp difference. The integrator configured to convert the detected timestamp difference into displacement of the microactuator by integrating the detected timestamp difference. The feedforward controller provides a manipulating variable corresponding to the converted displacement, to a feedback control loop for the microactuator as a feedforward manipulating variable.

20 Claims, 5 Drawing Sheets

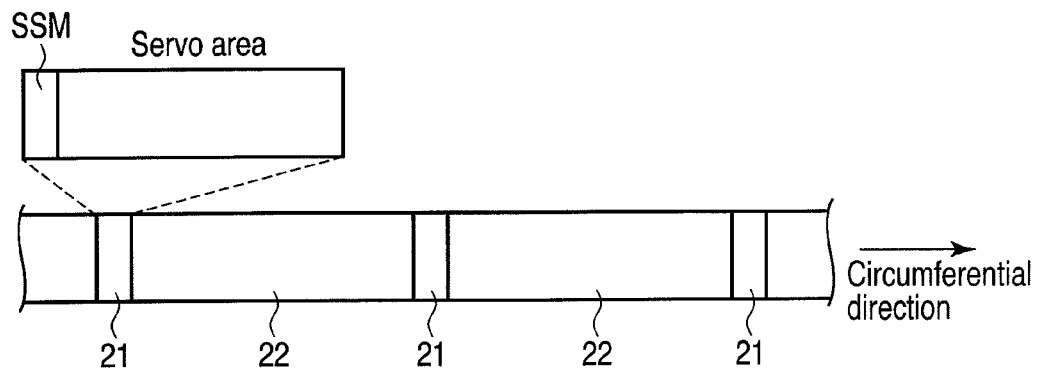
F I G. 2
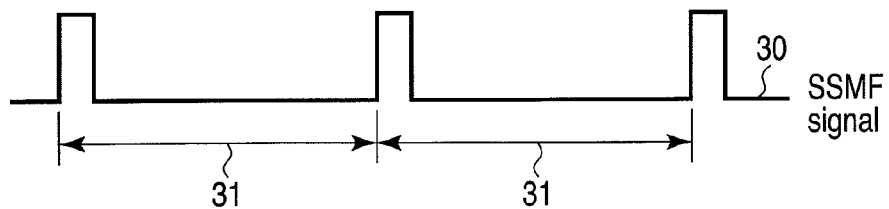
F I G. 3A
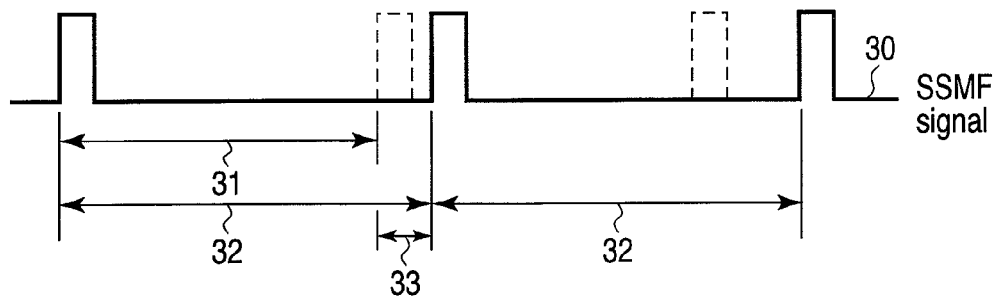
F I G. 3B
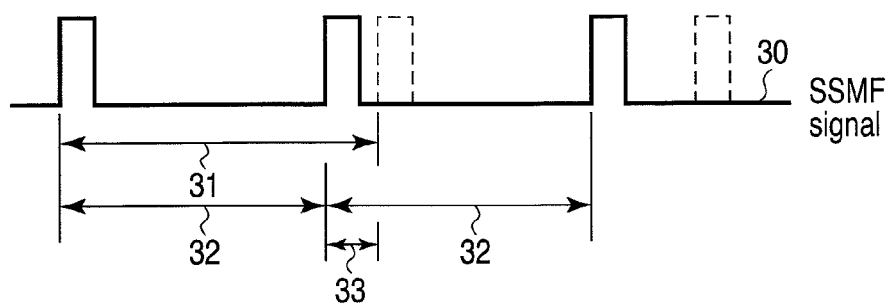
F I G. 3C

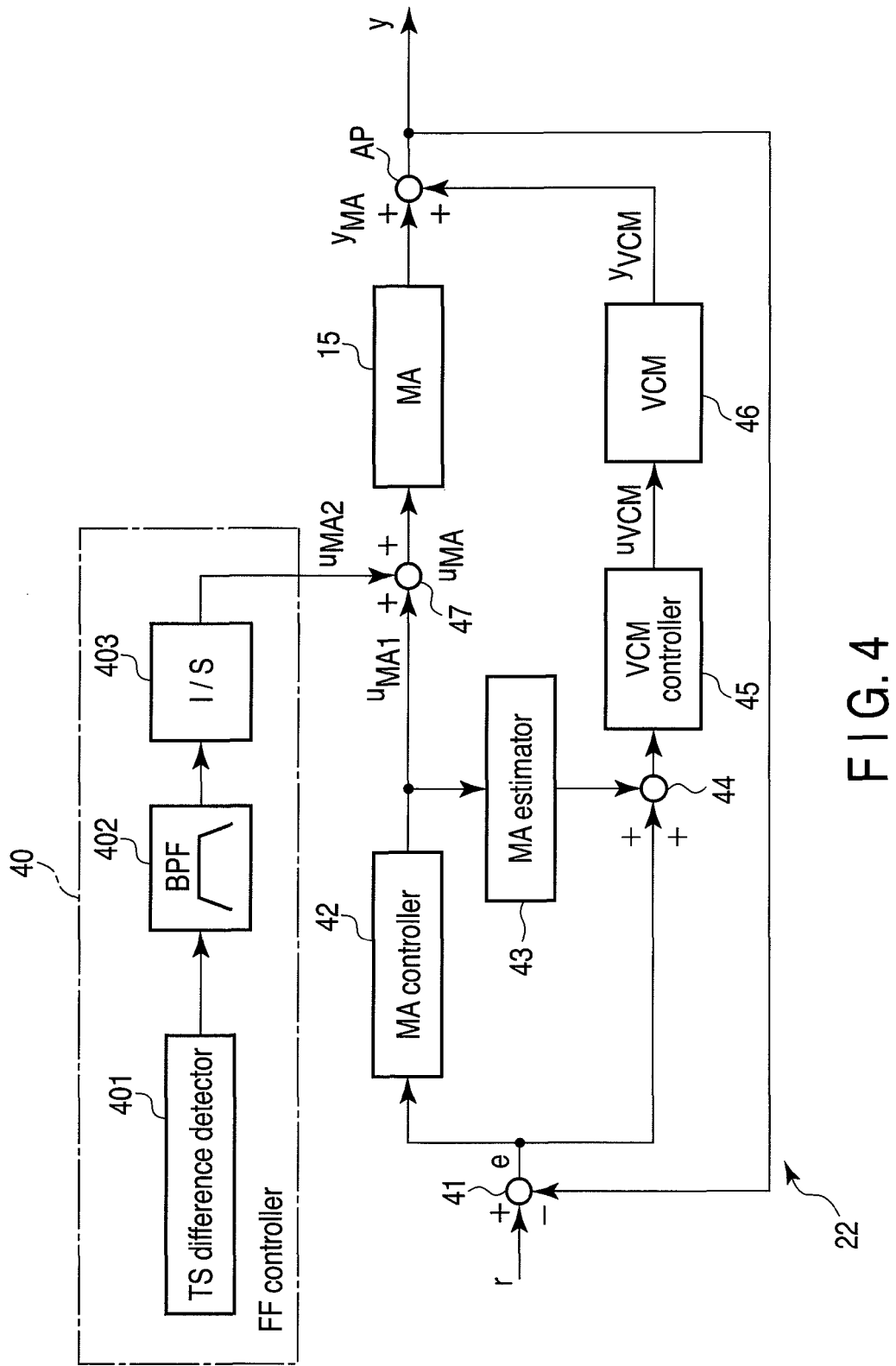
F I G. 4

MAGNETIC DISK DRIVE AND METHOD FOR CONTROLLING MICROACTUATOR IN MAGNETIC DISK DRIVE

CROSS-REFERENCE TO RELATED APPLICATIONS

This application is based upon and claims the benefit of priority from prior Japanese Patent Application No. 2011-016318, filed Jan. 28, 2011, the entire contents of which are incorporated herein by reference.

FIELD

Embodiments described herein relate generally to a magnetic disk drive comprising a microactuator and a method for controlling the microactuator in the magnetic disk drive.

BACKGROUND

In recent years, magnetic disk drives have been increasing in capacity and thus in track density. With the increased track density, there have been growing demands for accurate head positioning. For accurate head positioning, the response speed in head positioning control needs to be improved, that is, the control frequency band needs to be shifted in a frequency increasing direction. Thus, magnetic disk drives have recently been proposed which comprise not only a VCM actuator but also a microactuator that is suitably follows high frequencies, that is, magnetic disk drives with a dual stage actuator (DSA) structure applied thereto.

The VCM actuator is driven by a voice coil motor (VCM). The VCM drives the VCM actuator when supplied with a current. That is, the VCM actuator is of a current driven type. In contrast, the microactuator is driven by applying a voltage to elements (for example, piezoelectric elements) forming the microactuator. That is, the microactuator is of a voltage driven type. Thus, the VCM actuator and the microactuator are different in driving method.

As a factor that affects the head positioning accuracy, disturbances such as vibrations and impacts to which the magnetic disk drive may be subjected are known. When the magnetic disk drive is subjected to such disturbances, the VCM actuator also vibrates, thus reducing the head positioning accuracy. Hence, to accurately position the head, disturbance compensation is required to suppress the adverse effect of the disturbance on the head positioning.

In general, feedback control is used for sudden disturbances such as vibrations or impacts. However, in an environment in which a severe disturbance is likely to occur, the disturbance resistance (vibration suppression) offered solely by the feedback control may be insufficient. Thus, feedforward control is applied to a steady-state disturbance such as runout.

When the VCM actuator is vibrated by the disturbance, acceleration occurs in the VCM actuator. Thus, in the conventional art, the acceleration of the VCM actuator is used for the feedforward control for compensating for the disturbance such as runout.

Disturbance feedforward control based on the acceleration is suitable for the current-driven VCM actuator. However, it is difficult to apply the disturbance feedforward control based on the acceleration to the voltage-driven microactuator. This is because the relationship between the acceleration and the voltage to be applied to the microactuator cannot be approximated by a linear expression.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a diagram showing an exemplary format for a disk shown in FIG. 1;

FIGS. 3A, 3B and 3C are diagrams illustrating examples of time intervals (timestamps) at which a head detects servo sync marks in servo areas on the disk;

FIG. 4 is a block diagram illustrating an exemplary configuration of a servo controller shown in FIG. 1;

DETAILED DESCRIPTION

Various embodiments will be described hereinafter with reference to the accompanying drawings. In general, according to one embodiment, a magnetic disk drive comprises a VCM actuator, a microactuator, a detector and a servo controller. The VCM actuator is configured to coarsely move a head. The microactuator is configured to slightly move the head. The detector is configured to detect, as actual timestamps, time intervals at which the head reads servo sync marks recorded on a disk at predetermined intervals. The servo controller is configured to control the VCM actuator and the microactuator with feedback control in order to position the head at a target position. The servo controller comprises a feedforward controller configured to compensate for disturbance. The feedforward controller comprises a difference detector and an integrator. The difference detector is configured to detect a deviation of the actual timestamps from target timestamps as a timestamp difference. The integrator is configured to convert the detected timestamp difference into displacement of the microactuator by integrating the detected timestamp difference. The feedforward controller is configured to provide a manipulating variable corresponding to the converted displacement, to a feedback control loop for the microactuator as a feedforward manipulating variable.

First Embodiment

Figure 1:
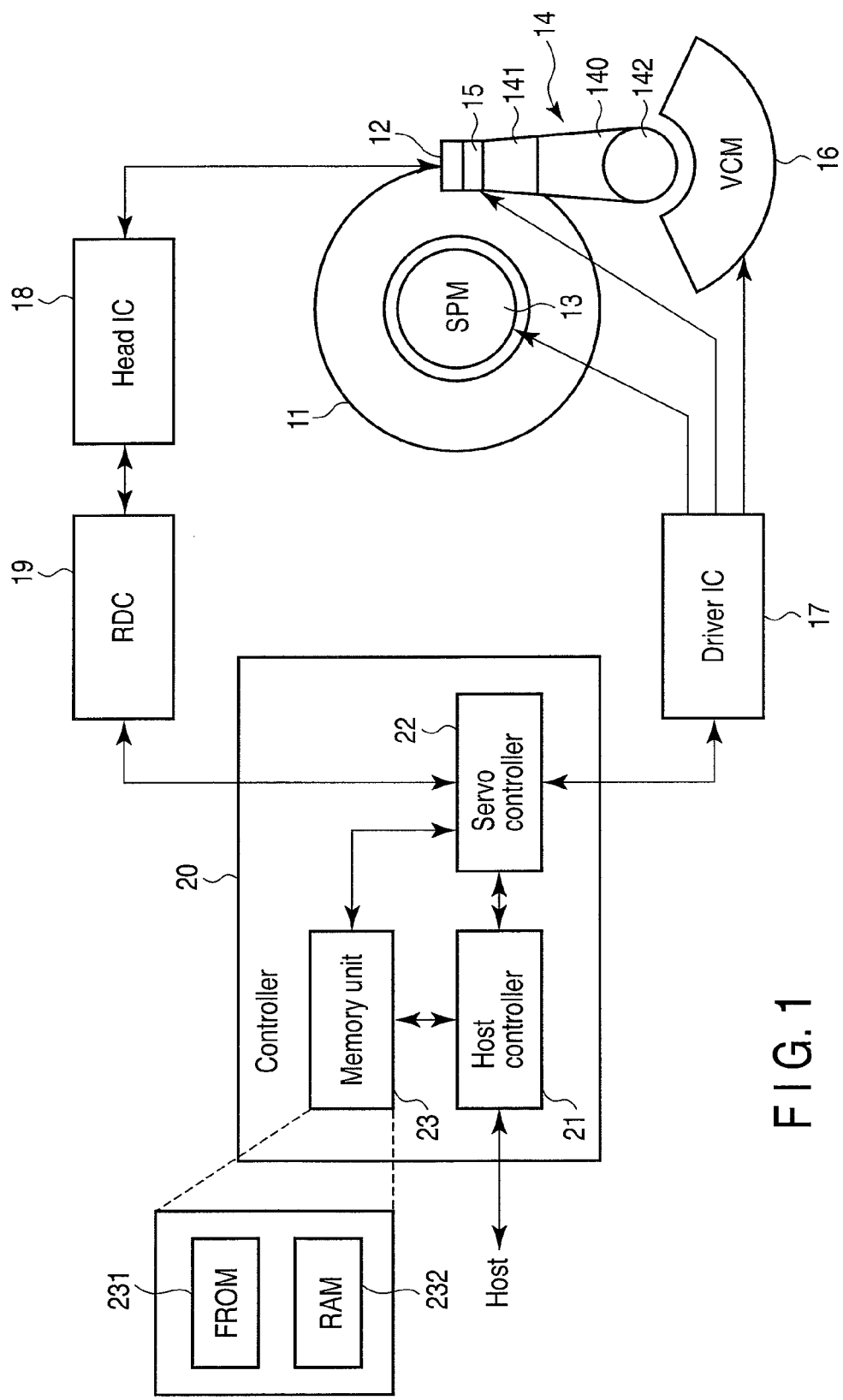
FIG. 1 is a block diagram showing an exemplary configuration of a magnetic disk drive according to a first embodiment.

FIG. 1 is a block diagram showing a configuration of a magnetic disk drive according to a first embodiment. The magnetic disk drive (hereinafter referred to as HDD) shown in FIG. 1 comprises a disk (magnetic disk) 11, a head (magnetic head) 12, a spindle motor (SPM) 13, a VCM actuator (VCMA) 14, a microactuator (MA) 15, a voice coil motor (VCM) 16, a driver integrated circuit (driver IC) 17, a head IC 18, a read channel (RDC) 19, and a controller 20.

The disk is a magnetic recording medium. For example, one surface of the disk 11 forms a recording surface on which data is magnetically recorded. The disk 11 is rotated at a high speed by SPM 13. SPM 13 is driven by a drive current (or a drive voltage) supplied by the driver IC 17.

The head 12 is arranged in association with a recording surface of the disk 11. The head 12 comprises a read element and a write element (neither of the elements is shown in the drawings). The head 12 is used to write data to the disk 11 and to read data from the disk 11. In the configuration in FIG. 1, an HDD comprising a single disk 11 is assumed. However, the HDD may comprise a plurality of disks 11 stacked therein. Furthermore, in the configuration in FIG. 1, one surface of the disk 11 forms a recording surface. However, both surfaces of the disk 11 may form recording surfaces, with two heads arranged in association with the respective recording surfaces.

VCMA 14 comprises an arm 140. The head 12 is attached to a leading end of a suspension 141 extending from the arm 140 of VCMA 14 (more specifically, the head 12 is attached to a head slider provided at the leading end of the suspension 141). MA 15 is attached to the suspension 141 (more specifically, MA 15 is attached between the suspension 141 and the head slider). Thus, the HDD shown in FIG. 1 employs a dual stage actuator (DSA) structure comprising VCMA 14 and MA 15. MA 15 is driven in accordance with a manipulating variable $u_{MA}$ provided by a servo controller 22 described below (more specifically, MA 15 is driven in accordance with a drive voltage specified by the manipulating variable $u_{MA}$) via the driver IC 17. This allows MA 15 to slightly move the corresponding head 12.

VCMA 14 is pivotally movably supported around a pivotal axis 142. VCMA 14 comprises VCM 16. VCM 16 is a drive source for VCMA 14. VCM 16 is driven in accordance with a manipulating variable $u_{VCM}$ provided by the servo controller 22 via the driver IC 17 (more specifically, VCM 16 is driven in accordance with a drive current specified by the manipulating variable $u_{VCM}$) to pivotally move VCMA 14 around the pivotal axis 142. That is, VCM 16 moves the arm 140 in a radial direction of the disk 11. Thus, the head 12 is also moved in the radial direction of the disk 11.

The driver IC 17 drives SPM 13, VCM 16 (VCMA 14), and MA 15 under the control of the servo controller 22. The head IC 18 is also called a head amplifier and amplifies a signal read by the head (that is, a read signal). The head IC 18 also converts write data output by RDC 19 into a write current. The head IC 18 then outputs the write current to the head 12.

RDC 19 processes signals related to reading and writing operations. That is, RDC 19 converts the read signal amplified by the head IC 18 into digital data, and decodes read data from the digital data. RDC 19 also extracts servo data (a servo pattern) from the digital data. RDC 19 also encodes write data transferred by the controller 20. RDC 19 transfers the encoded write data to the head IC 18. RDC 19 further has a function to detect timestamps described below.

Now, the timestamps will be described with reference to FIGS. 2, 3A, 3B and 3C. FIG. 2 shows an exemplary format for the disk 11 shown in FIG. 1. Servo areas 21 are discretely arranged on the disk 11 at predetermined intervals in, for example, a circumferential direction of the disk 11. Each of the areas between the adjacent servo areas 21 is designated as a data area 22. Servo data is recorded in the servo area 21. A servo sync mark SSM is recorded at, for example, a leading position of the servo area 21 to allow the start position of the servo area 21 (more specifically, the start position of the servo data recorded in the servo area 21) to be detected.

FIGS. 3A, 3B and 3C illustrate examples of time intervals at which the head 12 detects (reads) the servo sync marks SSM in the servo areas 21 on the disk 11. The time intervals (servo time intervals) at which the servo sync marks SSM are detected are hereinafter referred to as timestamps (TS).

RDC 19 comprises a generator (not shown in the drawings) configured to detect the servo sync marks SSM in the digital data to generate a servo sync mark found (SSMF) signal 30 illustrated in FIGS. 3A, 3B and 3C. The generator is hereinafter referred to as the servo sync mark found (SSMF) generator (SSMFG). The SSMF signal 30 is a binary signal which shifts from a first state to a second state every time the servo sync mark SSM is detected and which then returns to the first state a predetermined time later. That is, the SSMF signal 30 comprises a pulse train corresponding to timings at which the servo sync marks SSM are detected.

FIG. 3A illustrates an example of the SSMF signal 30 in an ideal state. The ideal state refers to a state in which, for example, the HDD shown in FIG. 1 is not subjected to any disturbance and in which the center of the disk 11 is not eccentric to the center of rotation (that is, the axis of rotation of SPM 13). RDC 19 comprises a timestamp detector (not shown in the drawings) allowing a predetermined counter to detect (measure) the time intervals (that is, the timestamps) at which the servo sync marks SSM are detected, based on the SSMF signals 30. The counter counts time based on a frequency clock oscillated by, for example, a crystal oscillator. The timestamps 31 in the SSMF signal 30 in such an ideal state as shown in FIG. 3A are hereinafter referred to as the target timestamps (or target servo time intervals) 31.

FIGS. 3B and 3C illustrate examples of the SSMF signal 30 in a state in which the HDD shown in FIG. 1 is subjected to a disturbance, for example, a vibration or impact. In FIGS. 3B and 3C, a dashed line indicates the SSMF signal 30 in the ideal state. Furthermore, FIGS. 3B and 3C illustrate timestamps 32 actually detected by RDC 19. The actually detected timestamps 32 are hereinafter referred to as the actual timestamps (or actual servo time intervals) 32. FIGS. 3B and 3C further illustrate the target timestamps 31 shown in FIG. 3A, for comparison with the actual timestamps 32.

When the HDD shown in FIG. 1 is subjected to a disturbance, VCMA 14 and MA 15 vibrate and the head 12 also vibrates. Then, even if the disk 11 is rotating at a predetermined rotation speed with possible runout prevented, the actual timestamps 32 may deviate from the target timestamps 31 as illustrated in FIG. 3B or 3C. FIGS. 3B and 3C also illustrate the deviations (timestamp differences) 33 of the actual timestamps 32 from the target timestamps.

With reference again to FIG. 1, the controller 20 comprises a host controller 21, a servo controller 22, and a memory unit 23. The host controller 21 transmits and receives signals to and from a host via an external interface. Specifically, the host controller 21 receives commands (a write command, a read command, and the like) transferred by the host via the external interface. The host controller 21 also controls the data transfer between the host and the host controller 21.

The servo controller 22 controls VCM 16 via the driver IC 17 for coarse adjustment in positioning the head 12 at a target position on the disk 11. Here, controlling VCM 16 is equivalent to controlling VCMA 14 comprising VCM 16. The servo controller 22 further controls MA 15 via the driver IC in order to fine-tune the position of the head 12.

In the embodiment, each of the host controller 21 and the servo controller 22 comprises a CPU (not shown in the drawings). CPUs implement the functions of the host controller 21 and the servo controller 22 by executing control programs for the host controller 21 and the servo controller 22, respectively, stored in FROM 231 described below. A single CPU may execute the respective control programs for the host controller 21 and the servo controller 22 using time-sharing.

The memory unit 23 comprises a flash ROM (FROM) 231 and RAM 232. FROM 231 is a rewritable nonvolatile memory. The control programs required to implement the functions of the controller 20 including the host controller 21 and the servo controller 22 are pre-stored in FROM 231. At least a part of a storage area in RAM 232 is used as a work area for the host controller 21 and the servo controller 22. In FIG. 1, for simplification, a disk controller generally included in the controller 20 is omitted. The disk controller controls writes of data to the disk 11 and reads of data from the disk 11.

FIG. 4 is a block diagram showing an exemplary configuration of the servo controller 22 shown in FIG. 1. The servo controller 22 forms what is called a dual stage actuator following control system. The dual stage actuator following control system controls VCM 16 (indirectly controls VCMA 14, which is driven by VCM 16) and MA 15 based on servo data recorded on the disk 11 in order to position the head 12 at the target position. That is, the servo controller 22 controls VCM 16 based on feedback control to drive VCMA 14, thus coarsely adjusting the position of the head 12. The servo controller 22 also controls MA 15 based on feedback control to fine-tune the position of the head 12. Thus, MA 15 and VCM 16 (VCMA 14) are control targets for the dual stage actuator following control system.

The servo controller 22 comprises a feedforward (FF) controller 40, a subtractor 41, a microactuator (MA) controller 42, a microactuator estimator 43, an adder 44, and a VCM controller 45.

In FIG. 4, a symbol y at an addition point AP indicates the position of the head 12 on the disk 11 (head position). Here, displacement of VCM 16 (more specifically, displacement of VCMA 14 driven by VCM 16) is denoted by Displacement of MA 15 is denoted by $y_{MA}$. In this case, the sum $(y_{VCM}+y_{MA})$ of the displacement $y_{VCM}$ and the displacement $y_{MA}$ is observed as the head position y at the addition point AP. The head position y is detected based on servo data extracted by RDC 19. The subtractor 41 calculates the difference of the head position y from a target position r to be a deviation e (=r−y). The MA controller 42 generates a manipulating variable $u_{MA1}$ to be provided to MA 15 based on the deviation e.

The MA estimator 43 estimates the displacement of MA 15 based on the manipulating variable $u_{MA1}$ to be provided to MA 15 by the MA controller 42. The adder 44 adds the displacement estimated by the MA estimator 43 to the deviation e calculated by the subtractor 44. The VCM controller 45 generates, based on an output from the adder 44, the manipulating variable $u_{VCM}$ to be provided to VCM 16. Thus, in the dual stage actuator following control system, the displacement determined by the MA estimator 43 is added to the deviation e. The addition result is then input to the VCM controller 45.

In the embodiment, the FF controller 40, configured to compensate for a disturbance, is added to a control loop for MA 15 in the above-described dual stage actuator following control system. More specifically, the FF controller 40 is added to an input side of MA 15 via the adder 47.

The FF controller 40 comprises a timestamp (TS) difference detector 401, a band pass filter (BPF) 402, and an integrator 403. The TS difference detector 401 detects the difference of the actual timestamps 32 from the target timestamps 31, that is, a timestamp difference 33. As described above, the actual timestamp is detected by RDC 19 every time RDC 19 detects the servo sync mark SSM. The actual timestamps may deviate from the target timestamps as a result of, for example, a disturbance. The disturbance generally contains a plurality of frequency components. Thus, the deviation of the timestamps also contains a plurality of frequency components.

BPF 402 allows passage of those of the plurality of frequency components contained in an output (timestamp difference) from the TS difference detector 401 which correspond to the control frequency band of MA 15 (more specifically, the control frequency band required for MA 15). The control frequency band of MA 15 is higher than the control frequency band of VCMA 14 (more specifically, the control frequency band required for VCMA 14). Thus, the frequency band of BPF 402 is set higher than the control frequency band of VCMA 14. Hence, BPF 402 removes the frequency components corresponding to the control frequency band of VCMA 14, from the output from the TS difference detector 401. That is, BPF 402 separates, from the output from the TS difference detector 401, at least the frequency components corresponding to the control frequency band of VCMA 14 (hereinafter referred to as the first control frequency band) and the frequency components corresponding to the control frequency band of MA 15 (hereinafter referred to as the second control frequency band). BPF 402 then allows the frequency components corresponding to the second control frequency band to pass through. In the first embodiment, the second control frequency band is at least twofold higher than the first control frequency band.

Instead of BPF 402, a high-pass filter (HPF) may be used which allows the frequency components of a frequency band exceeding the first control frequency band to pass through. The frequency components of the high frequency band allowed by HPF to pass through include the frequency components corresponding to the second control frequency band.

Figure 5:
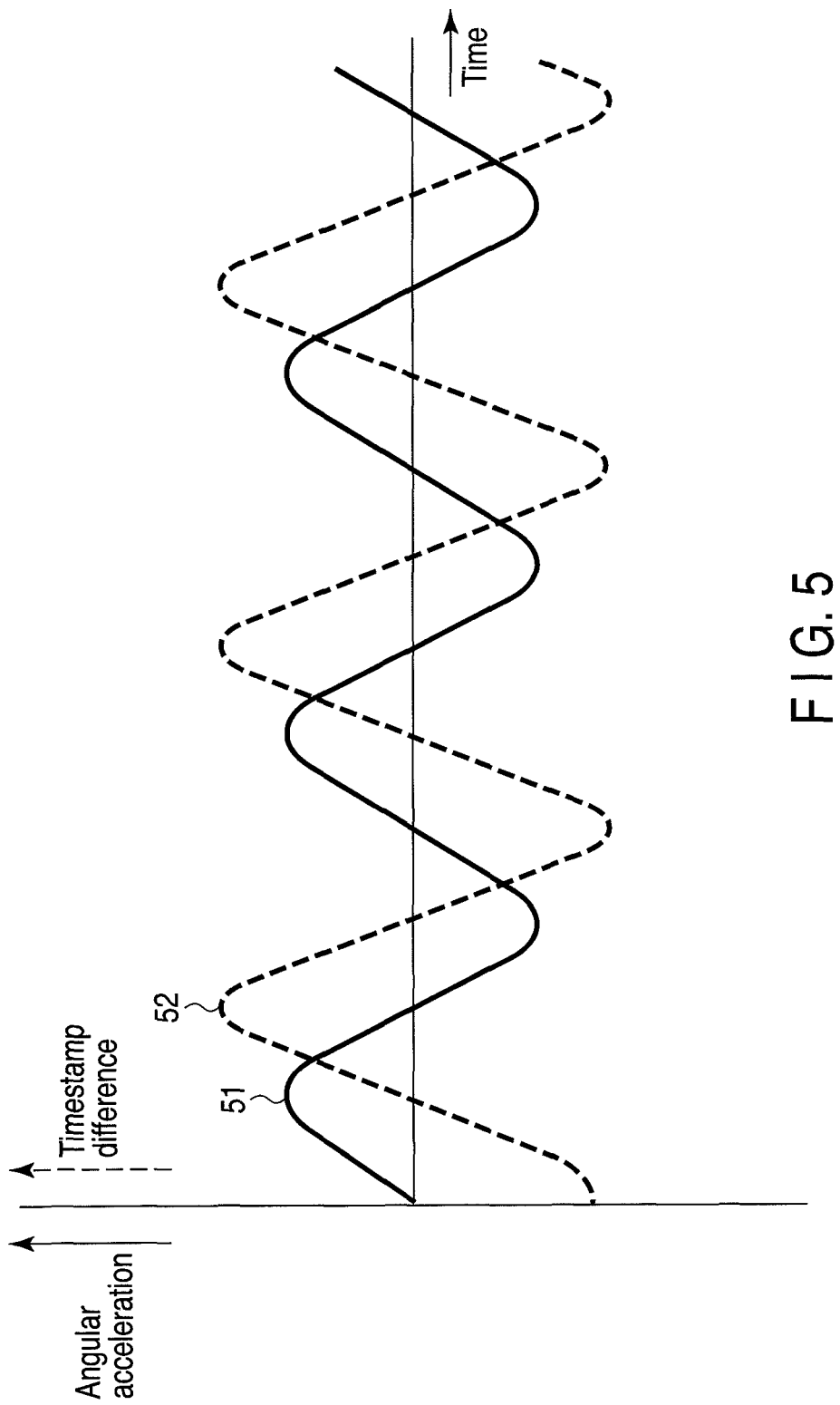
FIG. 5 is a diagram illustrating an example of a curve indicating the relationship between the acceleration of the disk and time and an example of a curve indicating the relationship between a timestamp difference and time, the relationships being observed while the magnetic disk drive shown in FIG. 1 is subjected to a disturbance.

FIG. 5 shows an example of a curve indicating the relationship between the acceleration (more specifically, the angular acceleration) of the disk 11 and time (this curve is hereinafter referred to as the acceleration curve) and an example of a curve indicating the relationship between the timestamp difference and time (this curve is hereinafter referred to as the timestamp difference curve); the relationships are observed while the HDD shown in FIG. 1 is subjected to a disturbance. In FIG. 5, a curve 51 shown by a solid line corresponds to the acceleration curve. A curve 52 shown by a dashed line corresponds to the timestamp difference curve.

As is apparent from the acceleration curve 51 and timestamp difference curve 52 shown in FIG. 5, while the HDD shown in FIG. 1 is subjected to a disturbance, the timestamp difference indicated by the output from the TS difference detector 401 is observed as a 90° delay in the angular acceleration of the disk 11. One of the factors for the delay is that the disturbance to which the HDD is subjected causes VCMA 14 and MA 15 to vibrate, thus vibrating the head 12. That is, when the head 12 vibrates, the actual timestamps may deviate from the target timestamps even when the disk is rotating at a predetermined rotation speed with possible runout prevented, as described above.

The deviation of the actual timestamps from the target timestamps, that is, the timestamp difference, is observed as a 90° delay in the angular acceleration of the disk 11 as described above. This means that the timestamp difference indicates the angular acceleration of the disk 11. Furthermore, as is apparent from the causes of the timestamp difference, the angular acceleration substantially indicates the angular acceleration of MA 15 subjected to a disturbance.

If the HDD is subjected to a disturbance, the disk 11 may vibrate. The vibration of the disk 11 causes the actual timestamps to deviate from the target timestamps. That is, not only the vibration of MA 15 but also the vibration of the disk 11 is reflected in the timestamp difference. Obviously, like the vibration of MA 15, the vibration of the disk 11 affects the head positioning accuracy. This means that a vibration containing at least the vibration (absolute vibration) of MA 15 itself and the vibration (absolute vibration) of the disk 11 itself superimposed on each other can be considered to be the relative vibration of MA 15.

Thus, even if the disk 11 is vibrated by a disturbance, the timestamp difference can be considered to indicate the angular speed of MA 15. That is, in the first embodiment, the timestamp difference detected by the TS difference detector 401 can be obtained as the angular speed of MA 15. Hence, integration of the timestamp difference allows the timestamp difference to be converted into the deviation of the position of MA (that is, the displacement of MA 15) caused by the disturbance.

Thus, the FF controller 40 shown in FIG. 4 comprises the integrator 403 as described above. The integrator 403 is an integral element with a transfer function 1/S, and integrates frequency band components in the output (timestamp difference) from the TS difference detector 401 which have passed through BPF 402. The integrator 403 converts the timestamp difference into data indicative of the displacement (more specifically, the estimated displacement) of MA 15 caused by the disturbance. An output from the integrator 403, that is, data indicative of displacement of MA 15, is provided to the adder 47 as a manipulating variable (feedforward manipulating variable) $u_{MA2}$ used for disturbance compensation.

The adder 47 adds the feedforward variable $u_{MA2}$ to the manipulating variable $u_{MA1}$ output by the MA controller 42. The addition result of the adder 47 is provided to MA 15 via the driver IC 17 as a manipulating variable $u_{MA}$ (=$u_{MA1}$+$u_{MA2}$) corresponding to the compensated-for disturbance. MA 15 is driven in accordance with the manipulating variable $u_{MA}$ from the adder 47 (more specifically, with the drive voltage designated by the manipulating variable $u_{MA}$). Thus, MA 15 slightly moves the head 12.

According to the first embodiment, the feedforward manipulating variable $u_{MA2}$ corresponding to the estimated displacement of MA 15 is used for disturbance feedforward control for driving of the voltage-driven MA 15. The estimated displacement of MA 15 is obtained by integrating at least the frequency components of the second control frequency band contained in the timestamp difference (that is, the deviation of the timestamps or the deviation of the servo time intervals). That is, the feedforward manipulating variable $u_{MA2}$ is obtained by converting the deviation of the timestamps (that is, the speed of MA 15) into the displacement of MA 15 using the integration.

Thus, the feedforward manipulating variable uMA2 corresponds to the displacement (estimated displacement) of MA 15 caused by the disturbance. The relationship between the displacement and a voltage to be applied to MA 15 can be approximated by a linear expression. Hence, unlike in the case of the use of the angular acceleration, the feedforward manipulating variable $u_{MA2}$ is suitable for feedforward control of the voltage-driven MA 15. That is, according to the first embodiment, in an HDD to which the DSA structure is applied, the disturbance feedforward control suitable for the voltage-driven MA 15 can be easily achieved without using an acceleration sensor. This allows the disturbance compensation capability to be improved.

It is expected that the acceleration sensor detects the acceleration caused in MA 15 as a result of the disturbance and that the detected acceleration is then converted into the displacement of MA 15. This conversion is carried out by the following procedure. First, a first integrator integrates the detected acceleration to convert the detected acceleration into a speed. Then, a second integrator integrates the resultant speed to convert the resultant speed into the displacement of MA 15. The displacement of MA 15 is used as a feedforward manipulating variable. However, the feedforward manipulating variable lags the acceleration in phase by 180° as a result of the above-described two integrations. Thus, it is difficult to achieve sufficient disturbance compensation using the disturbance feedforward control based on the acceleration detected by the acceleration sensor, unlike in the case of the first embodiment.

Second Embodiment

Figure 6:
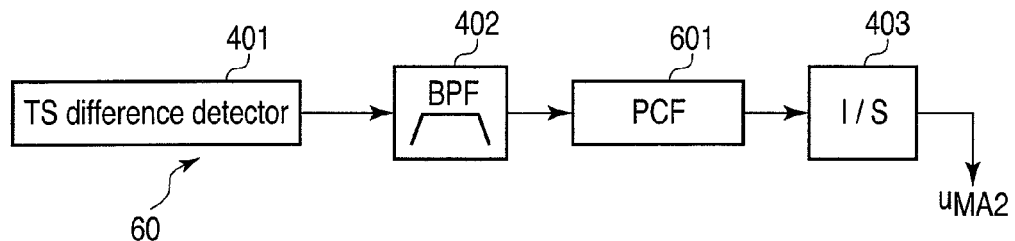
FIG. 6 is a block diagram showing an exemplary configuration of a feedforward controller in a servo controller applied in a magnetic disk drive according to a second embodiment.

Now, a second embodiment will be described. FIG. 6 is a block diagram showing an exemplary configuration of an FF controller in a servo controller applied in an HDD according to the second embodiment. The basic configuration of the HDD according to the second embodiment is similar to that of the HDD according to the first embodiment shown in FIG. 1. Thus, FIG. 1 is also referenced in the following description. Furthermore, elements in FIG. 6 which are equivalent to those of the FF controller 40 in the servo controller 22 shown in FIG. 4 are denoted by the same reference numbers and will not be described in detail.

In FIG. 6, an FF controller 60 is used instead of the FF controller 40 in the servo controller 22 shown in FIG. 4. The FF controller 60 comprises a phase compensation filter (PCF) 601 in addition to the TS difference detector 401, BPF 402, and the integrator 403. That is, the FF controller 60 is characterized in that PCF 601 is added to the FF controller 40 shown in FIG. 4. In the second embodiment, PCF 601 is interposed between an output of BPF 402 and an input of the integrator 403.

The phase of higher frequency components contained in the timestamp difference having passed through BPF 402 lags more significantly. Thus, PCF 601 compensates for the phase delay of the frequency components contained in the timestamp difference allowed by BPF 402 to pass through. This serves to expand a frequency band including those of the frequency components contained in the timestamp difference which are free from the phase delay.

The integrator 403 integrates a timestamp difference containing the frequency components with the phase delay compensated for by PCF 601. An output from the integrator 403, that is, data indicative of displacement of MA 15, is used as the feedforward manipulating variable $u_{MA2}$. Compared to the first embodiment, the second embodiment can expand the substantial control frequency band of MA 15. Thus, the head positioning accuracy can further be increased.

Third Embodiment

Figure 7:
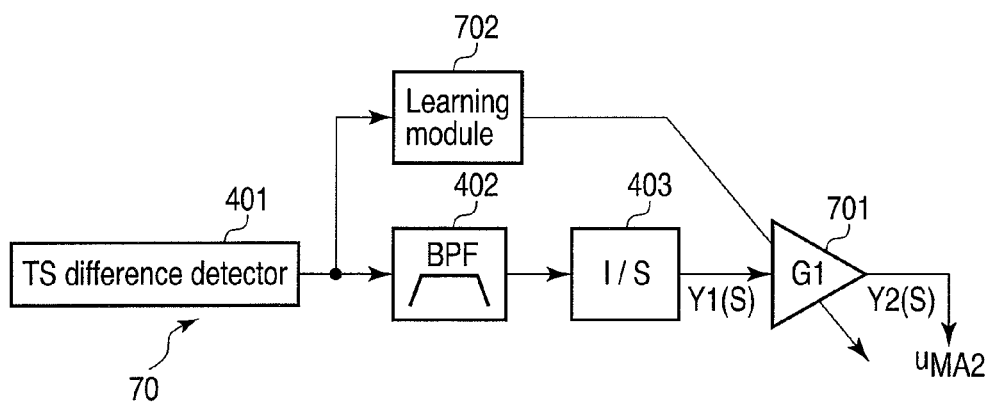
FIG. 7 is a block diagram showing an exemplary configuration of a feedforward controller in a servo controller applied in a magnetic disk drive according to a third embodiment.

Now, a third embodiment will be described. FIG. 7 is a block diagram showing an exemplary configuration of an FF controller in a servo controller applied in an HDD according to the second embodiment. The basic configuration of the HDD according to the third embodiment is similar to that of the HDD according to the first embodiment shown in FIG. 1. Thus, FIG. 1 is also referenced in the following description. Furthermore, elements in FIG. 7 which are equivalent to those of the FF controller 40 in the servo controller 22 shown in FIG. 4 are denoted by the same reference numbers and will not be described in detail.

In FIG. 7, an FF controller 70 is used instead of the FF controller 40 in the servo controller 22 shown in FIG. 4. The FF controller 70 comprises a variable gain amplifier 701 and a learning module 702 in addition to the TS difference detector 401, BPF 402, and the integrator 403. That is, the FF controller 70 is characterized in that the variable gain amplifier 701 and the learning module 702P are added to the FF controller 40 shown in FIG. 4.

The variable gain amplifier 701 is a gain element having a transfer function G1 and enabling gain (hereinafter referred to as the feedforward gain) G1 to be varied. The variable gain amplifier 701 uses the feedforward gain G1 to amplify or attenuate an output Y1(S) from the integrator 403. That is, the variable gain amplifier 701 multiplies Y1(S) by G1. In the third embodiment, an output Y2(S) (=G1×Y1(S)) from the variable gain amplifier 701 is used as the feedforward manipulating variable $u_{MA2}$.

The learning module 702 varies the feedforward gain G1 of the variable gain amplifier 701 so as to ideally reduce a timestamp difference output by the TS difference detector 401 to zero. To achieve this, the learning module 720 varies the feedforward gain G1 of the variable gain amplifier 701 as follows based on the timestamp difference output by the TS difference detector 401.

The timestamp difference output by the TS difference detector 401 is denoted by Terr(S). In this case, in order to converge the next timestamp difference output by the TS difference detector 401 to zero, the learning module 702 varies the feedforward gain G1 in accordance with:

$$G1 = G1 - K1 \times Terr(S)$$

where K1 denotes a compensation coefficient.

That is, the learning module 702 varies the feedforward gain G1 every time the TS difference detector 401 outputs a timestamp difference (Terr(S)). Thus, the next timestamp difference output by the TS difference detector 401 can be reduced close to zero. Obviously, if Terr(S) converges to zero, the feedforward gain G1 is prevented from varying.

Thus, according to the third embodiment, based on the timestamp difference output by the TS difference detector 401, the learning module 702 learns the feedforward gain G1 suitable for converging the next timestamp difference output by the TS difference detector 401 to zero. This serves to enhance the property of suppressing disturbance in accordance with the frequency of the disturbance, allowing the resistance of HDD to the disturbance to be improved. The variable gain amplifier 701 and the learning module 702 may be added to the FF controller 60 shown in FIG. 6.

Fourth Embodiment

Figure 8:
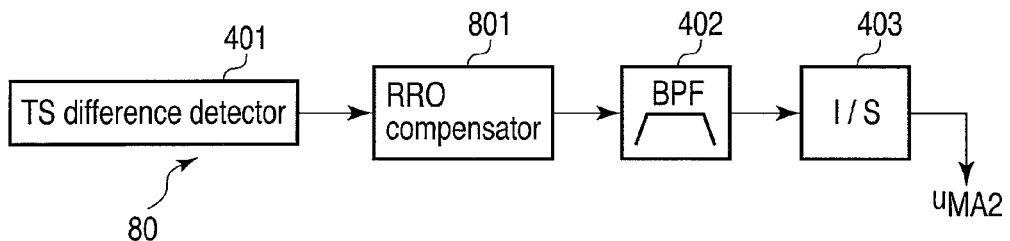
FIG. 8 is a block diagram showing an exemplary configuration of a feedforward controller in a servo controller applied in a magnetic disk drive according to a fourth embodiment.

Now, a fourth embodiment will be described. FIG. 8 is a block diagram showing an exemplary configuration of an FF controller in a servo controller applied in HDD according to the fourth embodiment. The basic configuration of HDD according to the fourth embodiment is similar to that of HDD according to the first embodiment shown in FIG. 1. Thus, FIG. 1 is also referenced in the following description. Furthermore, elements in FIG. 8 which are equivalent to those of the FF controller 40 in the servo controller 22 shown in FIG. 4 are denoted by the same reference numbers and will not be described in detail.

In FIG. 8, an FF controller 80 is used instead of the FF controller 40 in the servo controller 22 shown in FIG. 4. The FF controller 80 comprises a repeatable runout (RRO) compensator 801 in addition to the TS difference detector 401, BPF 402, and the integrator 403. That is, the FF controller 80 is characterized in that RRO compensator 801 is added to the FF controller 40 shown in FIG. 4. In the fourth embodiment, the RRO compensator 801 is interposed between an output of the TS difference detector 401 and an input of BPF 402.

The center of the disk 11, rotated by SPM 13, does not necessarily coincide with the axis of rotation of SPM 13. That is, the center of the disk 11 is generally eccentric to the axis of rotation of SPM 13. One of the causes of this runout is a possible assembly error during screwing of the disk 11 to a hub of SPM 13.

The runout of the disk 11 (that is, the disk runout) affects the timestamps. The adverse effect of the disk runout on the timestamps appears in synchronism with the rotation of the disk 11. Such disk runout is hereinafter referred to as repeatable runout (RRO). The timestamps (timestamp difference) contain a runout component of RRO, for example, a primary runout component of RRO (that is, the primary runout component that is in synchronism with the rotation of the disk 11). As is well known, the primary runout component can be pre-obtained. Using a compensation value corresponding to the primary runout component of RRO enables the primary runout component of RRO contained in the timestamp difference to be compensated for (removed), that is, enables the deviation of the timestamps caused by RRO to be compensated for.

Thus, in the fourth embodiment, the compensation value corresponding to the pre-obtained primary runout component of RRO is used as the compensation value (hereinafter referred to as the RRO compensation value) for the deviation of the timestamps caused by RRO. The RRO compensation value is stored in FROM 231 in the memory unit 23 provided in the controller 20 of HDD shown in FIG. 1.

The RRO compensator 801 compensates for a timestamp difference output by the TS difference detector 401 based on the RRO compensation value stored in FROM 231. That is, the RRO compensator 801 removes the primary runout component of RRO from the timestamp difference output by the TS difference detector 401. The timestamp difference compensated for by the RRO compensator 801 is input to BPF 402. Subsequent operations are similar to those of the FF controller 40 shown in FIG. 4.

According to the fourth embodiment, the adverse effect of RRO on feedforward control is reduced to allow the head positioning accuracy to be further improved. In the fourth embodiment, unlike in the case of HDD shown in FIG. 1, if two heads are arranged over the respective surfaces of the disk 11, the RRO compensation value may be stored for each head. Furthermore, the PRO compensation value may be stored for each predefined ring-like zone on the disk 11. At least one of the above-described embodiments can provide a magnetic disk drive that can carry out disturbance feedforward control suitable for a microactuator and a method for controlling the microactuator in the magnetic disk drive.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a voice coil motor (VCM) actuator configured to cause coarse movement of a head;
a microactuator configured to cause fine movement of the head;
a detector configured to detect, as first timestamps, time intervals at which the head reads servo sync marks recorded on a disk; and
a servo controller configured to control the VCM actuator and the microactuator with feedback control in order to position the head at a target position, the servo controller comprising a feedforward controller for the microactuator configured to compensate for disturbance,
wherein the feedforward controller comprises
a difference detector configured to detect a deviation of the first timestamps from target timestamps as a timestamp difference; and
an integrator configured to convert the timestamp difference into a displacement of the microactuator by integrating the timestamp difference,
wherein the feedforward controller is configured to provide a manipulating variable corresponding to the displacement, to a feedback control loop for the microactuator as a feedforward manipulating variable.

2. The magnetic disk drive of claim 1, wherein the feedforward controller further comprises a bandpass filter or a high-pass filter configured to allow frequency components of the timestamp difference to pass through, the frequency components including frequency components in a second control frequency band for the microactuator that is higher than a first control frequency band for the VCM actuator.

3. The magnetic disk drive of claim 2, wherein the feedforward controller further comprises a phase compensation filter configured to compensate for a phase delay in the timestamp difference.

4. The magnetic disk drive of claim 3, wherein the feedforward controller further comprises
a variable gain amplifier configured to amplify or attenuate the displacement; and
a learning module configured to vary a gain of the variable gain amplifier so as to reduce a next time stamp difference to zero based on when the timestamp difference is detected.

5. The magnetic disk drive of claim 2, wherein the feedforward controller further comprises
a variable gain amplifier configured to amplify or attenuate the displacement; and
a learning module configured to vary a gain of the variable gain amplifier so as to reduce a next time stamp difference to zero based on when the timestamp difference is detected.

6. The magnetic disk drive of claim 2, wherein the feedforward controller further comprises a repeatable runout compensator configured to compensate for the timestamp difference so as to remove a runout component synchronized with rotation of the disk from the timestamp difference.

7. The magnetic disk drive of claim 6, further comprising a storage module configured to store a compensation value corresponding to the runout component synchronized with the rotation of the disk,
wherein the repeatable runout compensator is further configured to compensate for the timestamp difference based on the stored compensation value.

8. The magnetic disk drive of claim 1, wherein the feedforward controller further comprises a phase compensation filter configured to compensate for a phase delay in the timestamp difference.

9. The magnetic disk drive of claim 1, wherein the feedforward controller further comprises
a variable gain amplifier configured to amplify or attenuate the displacement; and
a learning module configured to vary a gain of the variable gain amplifier so as to reduce a next time stamp difference to zero based on when the timestamp difference is detected.

10. The magnetic disk drive of claim 1, wherein the feedforward controller further comprises a repeatable runout compensator configured to compensate for the timestamp difference so as to remove a runout component synchronized with rotation of the disk from the timestamp difference.

11. A method for controlling a microactuator in a magnetic disk drive, the magnetic disk drive comprising a voice coil motor (VCM) actuator, a microactuator, and a servo controller, the VCM actuator being configured to cause coarse movement of a head, the microactuator being configured to cause fine movement of the head, the servo controller being configured to control the VCM actuator and the microactuator with feedback control in order to position the head at a target position, the method comprising:
detecting, as first timestamps, time intervals at which the head reads servo sync marks recorded on a disk;
detecting a deviation of the first timestamps from target timestamps as a timestamp difference;
converting the timestamp difference into a displacement of the microactuator by integrating the timestamp difference; and
providing a manipulating variable corresponding to the displacement, to a feedback control loop for the microactuator as a feedforward manipulating variable.

12. The method of claim 11, further comprising allowing frequency components of the timestamp difference to pass through, the frequency components including frequency components in a second control frequency band for the microactuator that is higher than a first control frequency band for the VCM actuator.

13. The method of claim 12, further comprising compensating for a phase delay in the timestamp difference, using a phase compensation filter,
wherein the servo controller further comprises the phase compensation filter.

14. The method of claim 13, further comprising varying a gain of a variable gain amplifier so as to reduce a next time stamp difference to zero based on when the timestamp difference is detected, the variable gain amplifier being configured to amplify or attenuate the converted displacement,
wherein the servo controller further comprises the variable gain amplifier.

15. The method of claim 12, further comprising varying a gain of a variable gain amplifier so as to reduce a next time stamp difference to zero based on when the timestamp difference is detected, the variable gain amplifier being configured to amplify or attenuate the converted displacement,
wherein the servo controller further comprises the variable gain amplifier.

16. The method of claim 12, further comprising compensating for the timestamp difference so as to remove a runout component synchronized with rotation of the disk from the timestamp difference.

17. The method of claim 16, wherein the timestamp difference is compensated for based on a compensation value corresponding to the runout component synchronized with the rotation of the disk, the compensation value being stored in a storage module.

18. The method of claim 11, further comprising compensating for a phase delay in the timestamp difference, using a phase compensation filter,
   wherein the servo controller further comprises the phase compensation filter.

19. The method of claim 11, further comprising varying a gain of a variable gain amplifier so as to reduce a next time stamp difference to zero based on when the timestamp difference is detected, the variable gain amplifier being configured to amplify or attenuate the converted displacement,
   wherein the servo controller further comprises the variable gain amplifier.

20. The method of claim 11, further comprising compensating for the timestamp difference so as to remove a runout component synchronized with rotation of the disk from the timestamp difference.

* * * * *